March 8, 1927. 1,620,066

L. BRENNEIS

DISK HARROW

Filed Jan. 5, 1925 4 Sheets-Sheet 1

INVENTOR
LOUIS BRENNEIS,
By
ATTORNEY.

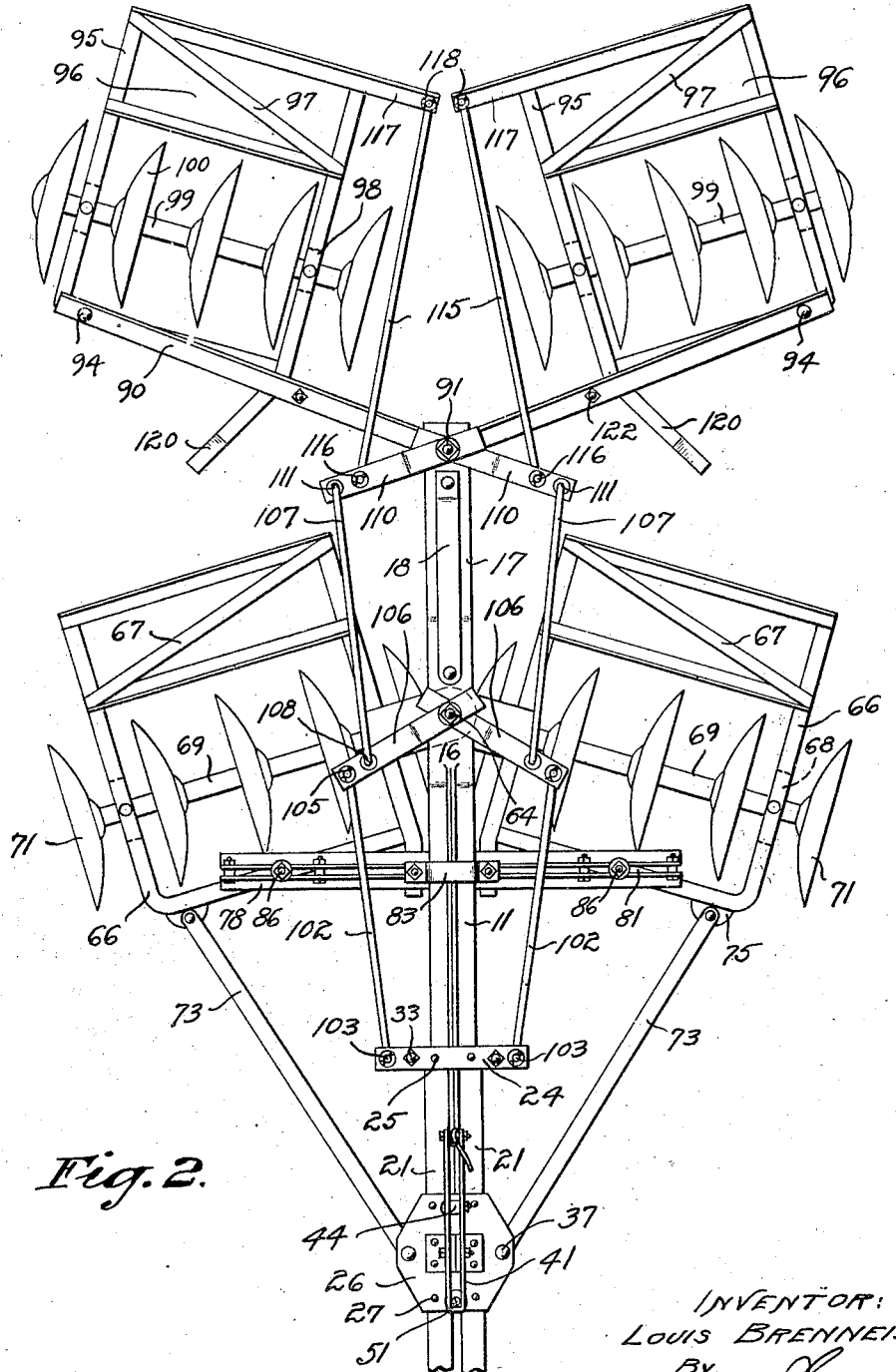

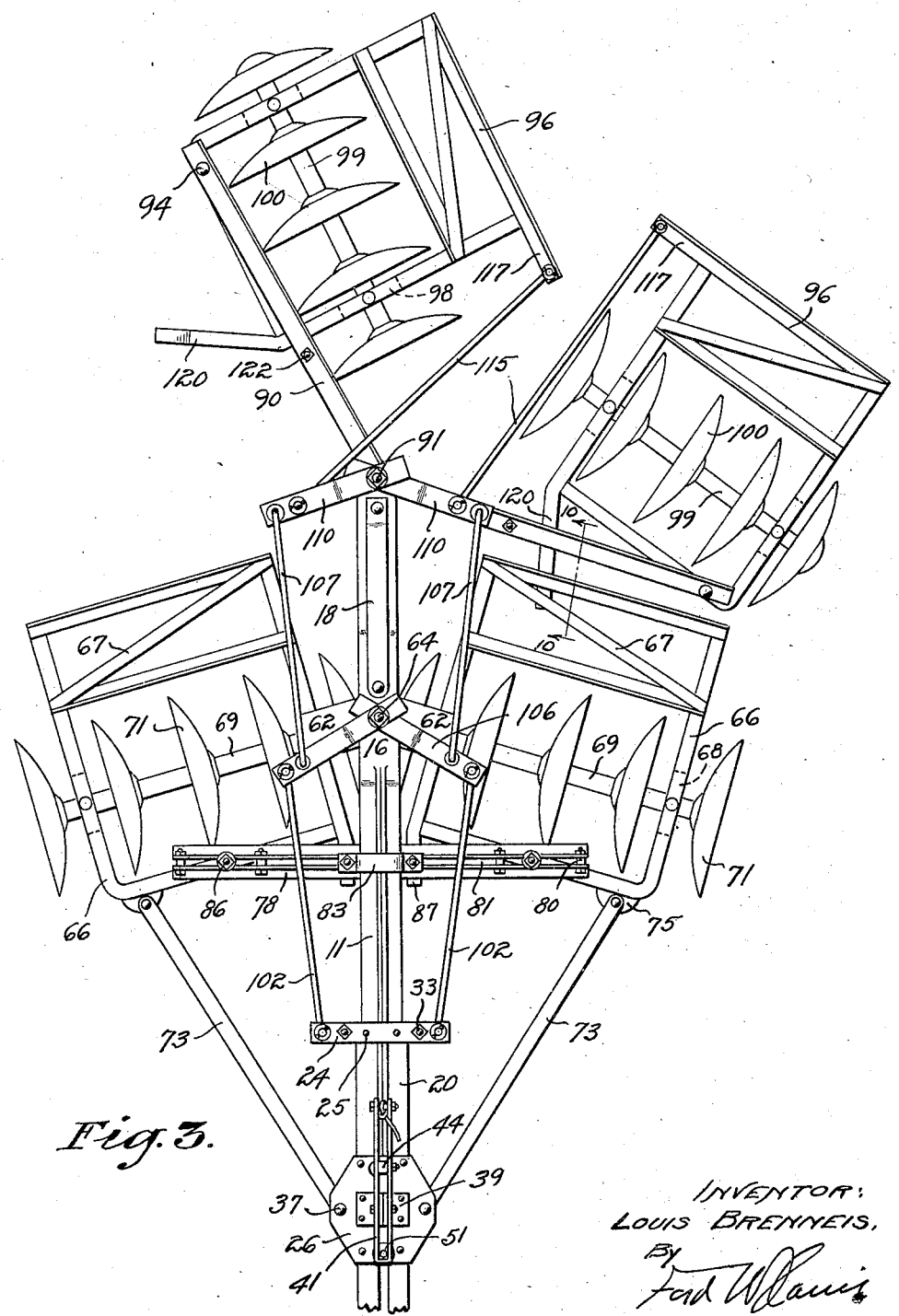

March 8, 1927.
L. BRENNEIS
DISK HARROW
Filed Jan. 5, 1925 4 Sheets-Sheet 4
1,620,066
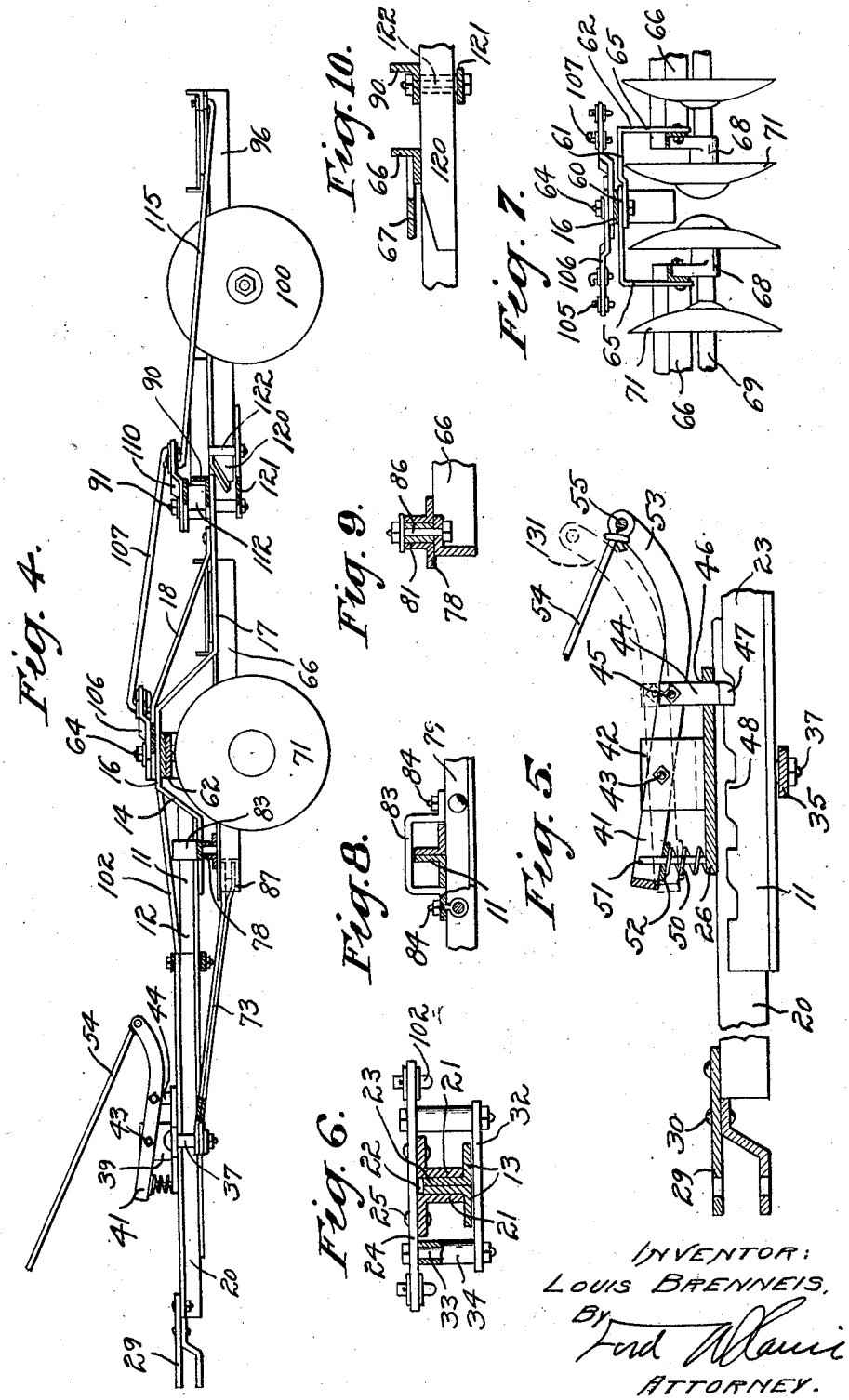
INVENTOR:
LOUIS BRENNEIS,
By
ATTORNEY.

Patented Mar. 8, 1927.

1,620,066

UNITED STATES PATENT OFFICE.

LOUIS BRENNEIS, OF OXNARD, CALIFORNIA, ASSIGNOR TO BRENNEIS MANUFACTURING COMPANY, OF OXNARD, CALIFORNIA, A CORPORATION OF CALIFORNIA.

DISK HARROW.

Application filed January 5, 1925. Serial No. 542.

This invention relates to farm implements, and more particularly to disk harrows which are used for tilling and preparing the soil previous to planting.

Disk harrows generally have a main frame to which a plurality of gangs of harrow disks are attached. The harrow is pulled over the ground, and the disks penetrate the ground in such a manner as to break up and turn the soil. In working position the disks are arranged in parallel planes at an angle to the line of direction of the harrow. Means are generally provided for swinging the gangs so as to move the disks from angular relationship with the line of direction into planes parallel with the line of direction of the harrow, thus swinging the disks into non-working position.

It is an object of my invention to provide a disk harrow having gangs which may be readily shifted from non-working to working position. I provide a main frame and front gang structures which are pivotally attached thereto. A pivot frame is pivotally secured to the main frame and rear gang structures are in turn pivotally secured to the pivot frame. Suitable links are extended to the front gang structures and the rear gang structures for retaining them in either non-working or working position.

It is another object of the invention to provide a means for moving the gang constructions from non-working into working position. I provide relatively movable frames, the front gangs and the pivot frame being supported by one of said frames and links for retaining the gangs in non-working or working position are attached to the other of said movable frames. Means is provided for preventing relative movement between these frames, said means being operable in a manner to permit a relative movement between said frames. When a relative movement between said frames occurs, the front and rear gang structures are moved from non-working position into working position.

It is a still further object of my invention to provide a disk harrow in which the working position thereof is adjustable. I accomplish this object by providing a means for regulating the relative movement between said relatively movable frames.

It is another object of my invention to provide a disk harrow in which the links which extend to the rear gang structures will not interfere with the front gang structures. I accomplish this by making the links to the rear gang structures in sections which connect with arms, said sectional links extending centrally along the harrow to the rearward portion thereof adjacent to the main or central frame construction thereof.

It is a further object of my invention to provide a disk harrow having stabilizing means for preventing buckling or twisting of any of the gang structures on their pivots. In the operation of a disk harrow, there is a tendency for some of the harrow disks to penetrate the ground more than others. This tends to twist the gang structures on their pivots. In my invention I provide a means for eliminating twisting or buckling in the gang constructions, and thus prevent any of the disks from penetrating the soil greater distances than others.

It is a still further object of my invention to provide a disk harrow of the character described which is very rigid and simple in its construction and may be produced at a fairly low cost.

Other objects and advantages of the invention will be made evident hereinafter.

Referring to the four sheets of drawings which are for illustrative purposes only, Fig. 1 is a plan view of a disk harrow embodying the features of my invention, the harrow in this view being shown in non-working position.

Fig. 2 is a view similar to Fig. 1 but showing the harrow in working position.

Fig. 3 is a plan view of a disk harrow in working position, this view showing the positions of the parts during a turning of the harrow.

Fig. 4 is a section taken on a line 4—4 of Fig. 1.

Fig. 5 is an enlarged fragmentary partially sectioned view showing the locking mechanism for locking a main frame and a draft frame from relative movement.

Fig. 6 is an enlarged fragmentary sectional view taken substantially on a line 6—6 of Fig. 1.

Fig. 7 is a fragmentary view taken on a line 7—7 of Fig. 1.

Fig. 8 is a section taken substantially on a line 8—8 of Fig. 1.

Fig. 9 is a sectional view taken substantially on the line 9—9 of Fig. 1.

Fig. 10 is a sectional view taken substantially on a line 10—10 of Fig. 3.

Figure 1:
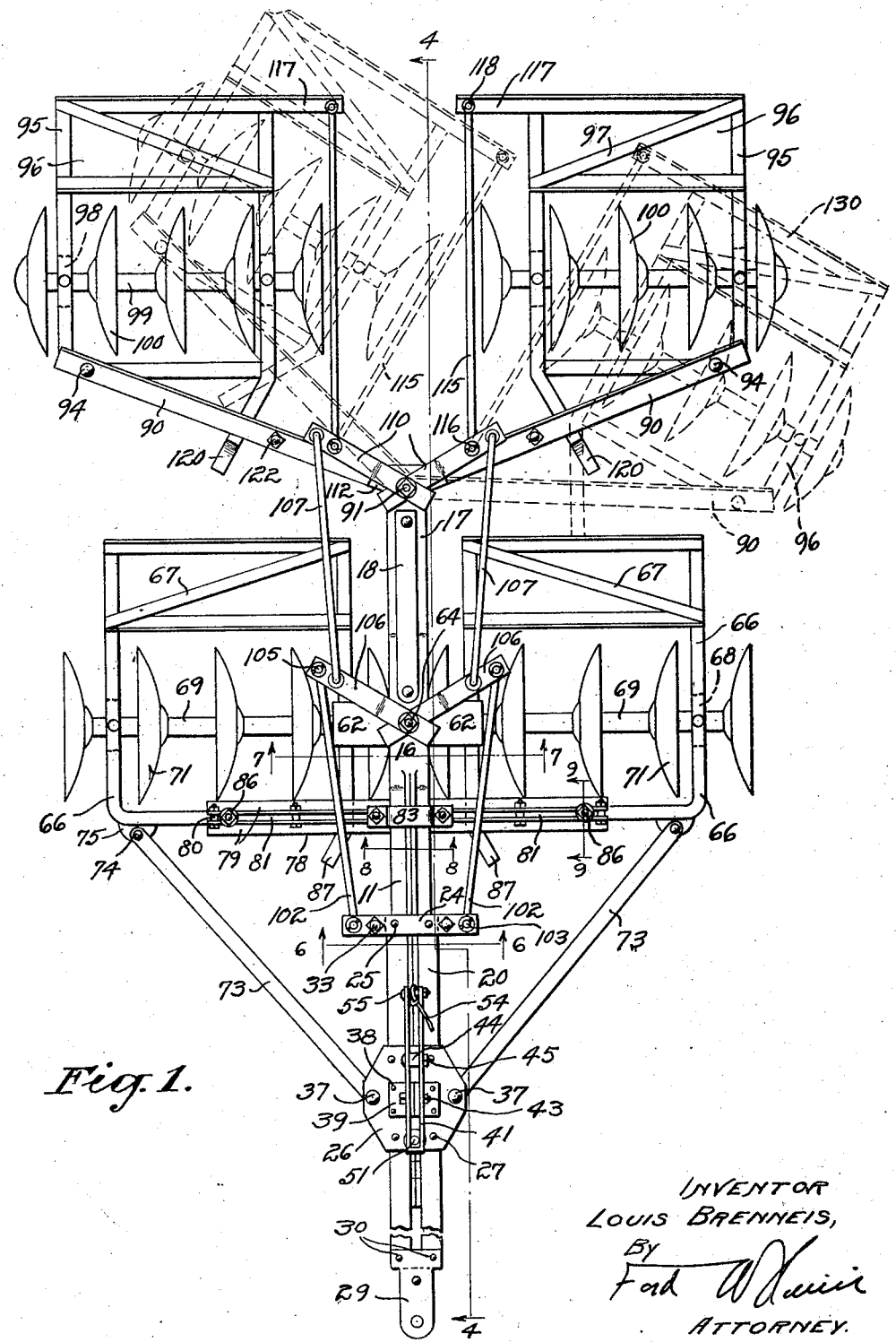

The form of my invention shown in the drawing has a main frame 11. The forward end 12 of the main frame 11 is of an inverted T-shape, as shown. The forward end 12 is preferably made of a pair of angles 13 which are arranged with their vertical legs in abutment so as to provide the T-shape shown. The rearward end 14 of the main frame 11 is in the form of a flat bar which is secured to the T formation 12 in any suitable manner, as by riveting or welding. The bar 14 is upwardly arched at 16. The rearward end 17 of the bar 14 extends horizontally, as shown, in a slightly lower plane than the forward portion 12 of the main frame 11. A brace 18 is provided to resist vertical movement in the rear portion 17 of the bar 14. A draft frame 20, having a pair of angle irons 21 which are arranged so as to provide a space 22 between the adjacent legs thereof, is carried by the forward end 12 of the main frame 11 in such a manner that an upwardly projecting leg 23 of the T formation 12 extends in the opening 22 of the draft frame 20. The angle irons 21 of the draft frame 20 are secured in the relationship shown by means of a bar 24, which is secured at the rearward end thereof by means of rivets 25; a mounting plate 26 which is centrally secured to the angle irons 21 by means of rivets 27; and at the extreme end thereof by a connection clevis 29 which is secured to the angles 21 by means of rivets 30. The connecting clevis 29 is provided for attaching the harrow to a suitable tractive vehicle (not shown) for drawing it over the ground. A bar 32 extends below the main frame 11 and is secured to the bar 24 of the draft frame 20 by means of bolts 33 having sleeves 34 thereupon. Secured to the mounting plate 26 is a bar 35 which extends under the front end 12 of the main frame 11, this bar 35 being secured to the mounting plate 26 by means of bolts 37. The bars 32 and 35 permit a relative longitudinal movement between the draft and main frames 20 and 11, respectively, but prevent a vertical relative movement therebetween.

In order to transfer a pull exerted on the draft frame 20 to the main frame 11, I provide latch mechanism which is clearly shown in Figs. 1, 4 and 5 of the drawings. Rivets 38 secure a bracket 39 to the mounting plate 26. A latch bar 41 is pivoted to a vertical leg 42 of the bracket 39 by a pivot bolt 43. A keeper 44 pivots at 45 to the latch bar 41 and extends downward through an opening 46 in the plate 26, the lower end 47 thereof being arranged for engagement with teeth 48 provided in the leg 23 in the forward end 12 of the main frame 11, as shown in Fig. 5. A spring 50 surrounding a pin 51 is provided for retaining the latch bar 41 in such a position that the keeper 44 will engage one of the teeth 48 of the said main frame 11, this spring 50 engaging the upper face of the mounting plate 26 and a bar 52 situated at the forward end of the latch bar 41. The rearward end 53 of the latch bar 41 is upwardly curved, as shown, and an actuating mechanism in the form of a rope 54 is connected thereto, said rope extending around the pin 55 carried by the arm 41. When the tractor is pulling the harrow, the pull on the draft frame 20 is transferred to the main frame 11 through the keeper 44. By pulling upon the rope 54 which is arranged for convenient actuation from the driver's seat of the tractive vehicle, the keeper 44 is removed from engagement with a tooth 48 and a relative movement between the draft frame 20 and the main frame 11 occurs.

As shown in Fig. 7, inner ends 60 of horizontal portions 61 of pivot arms 62 are pivotally attached to the arched portion 16 of the main frame 11 by means of a pivot bolt 64. The vertical portion 65 of the pivot arms 62 are secured as shown to front gang structure frames 66. The front gang frames 66 are substantially rectangular as shown and are provided with suitable bracings 67 for making these structures rigid. Bearings 68 secured to the frames 66 support shafts 69 on which a gang of harrow disks 71 are mounted as clearly shown in the drawings.

To prevent a free swinging of the front gang structures on the pivot 64 and to retain them in a desired position, I provide front links 73 which are pivotally attached at 74 66. The forward ends of the front link 73 are pivoted to the mounting plate 26 by means of the bolts 37, as shown in Fig. 4.

A stabilizing frame 78 is supported by the forward end 12 of the main frame 11, to lugs 75 of the front gang structure frames this stabilizing frame 78 being in the form of a pair of angle irons 79 having the adjacent legs thereof secured and spaced apart by means of bolts 80 in such a manner as to provide slots 81 therebetween. These angle irons 79, as shown in Fig. 8 of the drawings, extend below the forward portion of the main frame 11 and a yoke 83, which is secured to the angle irons 79 by means of bolts 84, extends over the forward end 12. The stabilizing frame 78 is arranged so as to be capable only of longitudinal movement along the forward portion 12 of the frame 11. As shown in Fig. 9, pins 86 are secured to the frames 66 and extend through the outer ends of the slots 81 of the stabilizing member 78. There is a tendency for the gang structures to swing or twist vertically upon the central pivot 64, this resulting from an inclination for some of the gang disks 71 to penetrate the ground a greater distance than the others. By securing the frames 66 to the stabilizing frame 78, a twisting or buckling of the front gang structure is opposed. I further oppose any buckling action by providing steady arms 87 which, as shown in the drawings, extend from the inner forward corners of the frame 66 and engage with the lower face of the stabilizing frame 78.

At the extreme rearward end of the portion 17 of the main frame 11, a pivot frame 90 is pivoted on a bolt 91. The opposite sides of the pivot frame 90 are angled slightly rearward with respect to the pivot 91. At the extreme outer ends of the pivot frame 90 I provide pivot pins 94, on which I pivot rear gang frames 95 of rear gang structures 96. These frames 95 are rectangular in shape and have suitable bracings 97, as shown. Bearings 98 are secured to the frames 95, which bearings 98 carry shafts 99 on which rear disks 100 are placed. For retaining the rear gang structures 96 in their proper positions, I provide means which includes primary links 102. The forward ends of the primary links 102 are pivoted to the outer ends of the bar 24 of the draft frame 20, as indicated at 103. The rearward ends of the primary links 102 pivot at 105 to primary arms 106, which primary arms 106 are pivoted to the arched portion 16 of the frame 11 by means of the pivot bolt 64, as clearly shown in Fig. 7 of the drawings. Secondary links 107 are pivotally attached at the forward ends to the primary arms 106, as indicated at 108 and are pivotally attached at the rearward ends thereof to the secondary arms 110 as indicated at 111. The secondary arms 110 are pivoted to the portion 17 of the main frame 11 by means of the pivot bolts 91, as shown, there being a block 112 for elevating the secondary arms 110 to a plane above that of the pivot frame 90. Tertiary links 115 pivot at 116 to the secondary arms 110 and extend rearward and pivot to inwardly extending legs 117 of the rear frames 95, as indicated at 118.

By pivoting the primary arms 106 on the elevated portion 16 of the frame 11, it is possible to extend the primary and secondary links 102 and 107 toward the rearward end of the harrow without in any way interfering with the operation of the forward gang structures, this arrangement serving to raise these parts, as clearly shown in Fig. 4, above any part of the front gang constructions. To resist buckling or twisting of the rear gang constructions 96 on their pivots 94, I provide steady arms 120 which extend forward from the inner corners of the frames 95. These arms extend below the pivot frame 90 and above a guide bar 121. This guide bar 121, as clearly shown in Fig. 10 of the drawings, is secured to the pivot frame 90 by means of bolts 122. The steady arm is prohibited from any vertical movement by the pivot frame 90 and the guide bar 121, but is free to move in a horizontal direction. This arrangement permits a free swinging of the gang structures horizontally on their pivots 94, but prevents any vertical twisting or buckling thereof.

In Fig. 1 I show the harrow in a nonworking position. In other words, the front and rear gang constructions are in such a position that the front and rear disks 71 and 100 are in planes parallel to the direction of motion of the harrow. When the harrow is drawn over the ground with the gang constructions in these positions, there will be no cultivating action of the disks upon the surface over which they are drawn. The dotted lines 130 of Fig. 1 illustrate the position of the pivot frame 90 and the rear gang constructions 96 when the harrow is being turned with the gang constructions in nonworking position. The primary and secondary links 102 and 107 and the primary and secondary arms 106 and 110 retain their normal position when the harrow is turned. The tertiary links 115, however, swing into the dotted line positions indicated in Fig. 1. It is evident that where single rods extended from the bar 24 to the legs 117, these rods would swing quite a distance to one side of the main frame 11 of the harrow and would result in an interference with the front gang structures. By providing a series of links and arms, it is possible to extend a link connection from the forward end of the harrow to the rear gang structures 96 without interference to any of the parts of the harrow at any time.

Considering that the harrow is being drawn by a suitable tractive vehicle (not shown) which is attached to the harrow by means of a clevis connection 29, and that it is desired to convert the harrow from nonworking position into working position, this is accomplished by pulling forwardly on the control rope 54. This results in a swinging of the latch bar 41 into a dotted line position 131, which removes the keeper 44 from engagement with any of the teeth 48 of the main frame 11. This permits a relative movement between the draft frame 20 and the main frame 11, permitting the draft frame 20 to move forward with respect to the main frame 11. When this occurs, a pull is exerted on the outer parts of the front gang frame 66 through the front links 73, thus swinging the front gang structures into a position shown in Fig. 2. Likewise, a forward pull is exerted through the primary links 102 on the primary arms 106, moving the arms 106 into the position shown in Fig. 2. The secondary arms 110 are moved from the position shown in Fig. 1 into the position shown in Fig. 2 by the secondary links 107. The secondary arms 110 exert a forward pull upon the tertiary links 115 which are connected to the links 117 of the rear gang structures 96. This swings the inner portions of the rear gang structure 96 forward into the position shown in Fig. 2.

In Fig. 2 it will be seen that the gang structures are swung into such a position that the disks 71 and 100 thereof are swung out of planes which align with the line of direction of the harrow. When the disks are in angular relationships, as shown in Fig. 2, the harrow is in working position and the disks penetrate and engage the ground in such a manner as to break up and turn the surface. Inspecting Fig. 2, it will be seen that the steady arms 120 of the rear gang structures 96 extend between the pivot frame 90 and the guide bar 121 a greater distance, and that the frames 95 are still protected against vertical movement or buckling. When the front gang frames 66 are swung from the position shown in Fig. 1 to the position shown in Fig. 2, the pins 86 are moved forwardly and inwardly about the pivot 64 of the front gang structures. The pins 86 slide inwardly in the slots 81 and move the stabilizing frame 78 forward with respect to the main frame 11, as is obvious from a comparison of Figs. 1 and 2. The steady arms 87 of the frames 66, however, still engage with the lower face of the stabilizer 78 and still serve to assist in preventing a twisting or buckling in the front gang structures.

In Fig. 3 I illustrate the positions of the parts of the harrow when it is being turned with the gangs arranged in working position. It will be seen that all of the parts of the device assume their usual positions with the exception of the pivot frame 90, the rear gang constructions 96 and the tertiary links 115. When in this position the steady arm 120 of the right hand rear gang construction 96 extends under and engages with the rearward position of the right hand front gang structure, as shown in Figs. 3 and 10. There is a tendency for the complete rear end of the harrow, including the pivot frame 90, to tilt when the harrow is being turned. This tilting is resisted by an engagement between an arm 120 and a frame 66 of the rear and front gang constructions, respectively, on the short side of the turn.

As shown in Fig. 5, the main frame 11 is provided with a series of teeth 48. This provides an adjustability of the working position of the harrow as it is possible for the keeper 44 to be selectively engaged with any of the teeth 48, thus varying the relative movement between the frames 20 and 11, and likewise variably controlling the working positions of the front and rear gang structures of the harrow.

When it is desired to return the gang constructions from working position to non-working position, it is necessary to return the frames 20 and 11 to their original positions. This is accomplished by backing the tractive vehicle. This moves the draft frame 20 rearward with respect to the main frame 11, and moves the front gang constructions and the rear gang constructions to their original non-working positions through the various link arrangements in a manner substantially the reverse of moving from non-working into working position. The latch keeper 44 automatically drops into engagement with a tooth 48 and retains the frames in this non-working position until the latch bar 41 is again swung through the rope 54.

From the drawings it is evident that a harrow of my invention is simple and rugged in construction, employing but few parts which may be made very heavy to withstand considerable strain. The stabilizing arrangements shown in the drawings minimize any twisting or buckling tendencies incurred in the gang constructions during the operation thereof. The relatively movable frames 20 and 11 provide a novel means for converting the harrow from non-working into working positions and reverse. This arrangement is not only simple in construction, but it is very easy to operate.

The novel form of link arrangement shown for controlling the positions of the rear gang constructions 96 is an important consideration of my invention. It is evident that by arching the main frame at 16 and by mounting the primary arms 106 thereupon, it is possible to extend these links to the rearward end of the harrow without in any way interfering with the front gang constructions. In the link arrangement shown, there is no swinging of the arrangement other than at the extreme rearward end thereof, and therefore there is no interference either to the main frame or other front gang constructions. Further by providing a series of links and arms, it is possible to provide a very rigid arrangement.

By providing an adjustability of the relative movement between the frames 20 and 11, I am able to adjust the working position of the harrow disks. In this manner it is possible to set the position of the disks in accordance with the characteristics of the soil being harrowed.

I claim as my invention:

1. In a disk harrow, the combination of: a main frame; front gang structures each having a rigid arm, said arms being pivoted to said main frame at a common point; a draft frame movable relative to said main frame; latch mechanism for locking said main frame and said draft frame against relative movement, said latch mechanism being operable in a manner to allow relative movement between said main frame and said draft frame; and front links extending between said front gang structures and said draft frame, said front links being adapted to normally retain said front gangs in non-working position and being adapted to move said front gang structures into working position when a relative movement occurs between said main frame and said draft frame.

2. In a disk harrow, the combination of: main draft means; front gang structures mounted thereon; rear gang structures; draft yoke means having a pivotal connection with said main draft means and pivotally connected to outer portions of said rear gang structures; and links pivotally connected to inner portions of said rear gang structures and to said main draft means at points disposed laterally outwardly from said pivotal connection between said draft yoke means and said main draft means, whereby the draft angles of said rear gang structures are altered when said harrow is drawn in an arcuate path so that said rear gang structures substantially trail said front gang structures.

3. In a disk harrow, the combination of: a main frame; front gang structures pivoted to said main frame; a draft frame movable relative to said main frame; latch mechanism for locking said main frame and said draft frame against relative movement, said latch mechanism being operable in a manner to allow relative movement between said main frame and said draft frame; front links extending between said front gang structures and said draft frame, said front links being adapted to normally retain said front gangs in non-working position and being adapted to move said front gang structures into working position when a relative movement occurs between said main frame and said draft frame; a stabilizing frame carried by said main frame being movable relative to said main frame in a longitudinal direction, said stabilizing frame having slots formed therein; a steady arm extending from each of said front gang structures and engaging said stabilizing frame; and a slide pin projecting from each of said front gang structures, each slide pin projecting through one of said slots in said stabilizer frame, said pins moving said stabilizer frame with said front gang structures when said latch mechanism is operated.

4. A disk harrow as defined in claim 1 in which said latch mechanism comprises: a mounting plate secured to said draft frame; a latch bar pivoted to said mounting plate; a keeper carried by said latch bar, said keeper being arranged to engage ratchet teeth provided by said main frame, thus retaining said frames relatively non-movable in a draft direction and permitting relative movement thereof in a reverse direction; a spring for resiliently urging said latch bar to engage said teeth; and means for swinging said latch bar so as to remove said keeper from said teeth, thus permitting relative movement between said main frame and said draft frame in the direction of draft.

5. In a ground working implement, the combination of: a main frame; a transverse pivot frame pivotally attached intermediate its ends to said main frame and free to swing in a horizontal plane; a pair of gang structures pivoted respectively to opposite ends of said pivot frame; a draft frame movable relative to the main frame; connections between the draft frame and the respective gang structures whereby movement of said draft frame relative to the main frame will swing the gang structures to and from angular working positions; and releasable means for retaining the draft frame in selective positions relative to the main frame, said connections permitting automatic gradual movement of the respective gang structures to change their positions relative to each other when the implement is turned from a straight to a curved path, and independently of relative movement of the draft and main frames.

6. In a disk harrow, the combination of: a main frame; a pivot frame pivotally attached to said main frames; rear gang structures pivoted to said pivot frame; a draft frame supported by said main frame, said draft frame being movable relative to said main frame; latch mechanism for locking said draft frame and said main frame against relative movement, said latch member being operable in a manner to permit a relative movement between said main frame and said draft frame; primary arms pivoted to said main frame; primary links extending between said draft frame and said primary arms; secondary arms pivoted to said main frame; secondary links extending between said primary and said secondary arms; and tertiary links extending between said secondary arms and said rear gang structures, said links and said arms being arranged to retain said rear gang structures in non-working position and being arranged to synchronously move when a relative movement between said main frame and said draft frame occurs, thereby allowing a movement of said rear gang structures into working position.

7. In a disk harrow, the combination of: a main frame having an upwardly arched portion; a pivot frame pivotally attached to said main frame; rear gang structures pivoted to said pivot frame; a draft frame supported by said main frame, said draft frame being movable relative to said main frame; latch mechanism for locking said draft frame and said main frame against relative movement, said latch member being operable in a manner to permit a relative movement between said main frame and said draft frame; primary arms pivoted to said arched portion of said main frame; primary links extending between said draft frame and said primary arms; secondary arms pivoted to said main frame; secondary links extending between said primary and said secondary arms; and tertiary links extending between said secondary arms and said rear gang structures, said links and said arms being arranged to retain said rear gang structures in non-working position and being arranged to synchronously move when a relative movement between said main frame and said draft frame occurs, thereby allowing a movement of said rear gang structures into working position.

8. In a ground working implement, a combination of: a main frame; a pair of front gang structures pivoted at their inner ends to said main frame; a transverse pivot frame pivotally attached intermediate its ends to said main frame rearwardly of said front gang structures and free to swing in a horizontal plane; a pair of rear gang structures pivoted at their outer ends respectively to opposite ends of said pivot frame; a draft frame movable relative to the main frame; connections between the draft frame and the outer ends of the respective front gang structures and between said draft frame and the inner ends of the respective rear gang structures whereby movement of said draft frame relative to the main frame will swing all of the gang structures to and from angular working positions; and a releasable means for retaining the draft frame in selective positions relative to the main frame, said connections permitting automatic gradual movement of the respective rear gang structures to change their positions relative to each other when the implement is turned from a straight to a curved path, and independent of relative movement of the draft and main frames and of the front gang structures.

9. In a disk harrow, the combination of: main draft means; front gang structures mounted thereon; rear gang structures; draft yoke means having a pivotal connection with said main draft means rearward from said front gang structures and pivotally connected to outer portions of said rear gang structures; and links pivotally connected to inner portions of said rear gang structures and to said main draft means at points disposed laterally outwardly from said pivotal connection between said draft yoke means and said main draft means, whereby the draft angles of said rear gang structures are altered when said harrow is drawn in an arcuate path so that said rear gang structures substantially trail said front gang structures.

10. In a disk harrow, the combination of: main draft means; front gang structures mounted thereon; a rigid yoke pivoted centrally upon said main draft means to the rear of said front gang structures; links pivotally connected to said main draft means; and rear gang structures each of which is pivotally connected to said yoke and one of said links whereby the draft angles of said rear gang structures are altered when said harrow is drawn in an arcuate path so that said rear gang structures substantially trail said front gang structures.

11. In a disk harrow, the combination of: main draft means; front gang structures mounted thereon; a rigid yoke pivoted centrally upon said main draft means to the rear of said front gang structures; links pivotally connected to said main draft means at points disposed laterally outwardly from said central yoke pivot; and rear gang structures each of which is pivotally connected at its outer portion to said yoke and at its inner portion to one of said links whereby the draft angles of said rear gang structures are altered when said harrow is drawn in an arcuate path so that said rear gang structures substantially trail said front gang structures.

12. In a disk harrow, the combination of: a main frame; a pair of front gang structures pivoted to said main frame; a transverse yoke pivotally attached to said main frame; a pair of rear gang structures pivoted at their outer portions to said yoke; a draft frame movable relative to said main frame; means for connecting said draft frame to said front gang structures; links pivotally connected to inner portions of said rear gang structures and to said draft frame at points disposed laterally outward from said yoke pivot to said main frame; and means for shifting said draft frame relative to said main frame to shift said gang structures between non-working and working positions, said yoke and links permitting the angling of said rear gang structures when said harrow is drawn in an arcuate path so that said rear gang structures substantially trail said front gang structures, whether said gang structures are in non-working or working position.

In testimony whereof, I have hereunto set my hand at Oxnard, California, this 30 day of December, 1924.

LOUIS BRENNEIS.